United States Patent
Corby, Jr.

(10) Patent No.: US 7,402,806 B2
(45) Date of Patent: Jul. 22, 2008

(54) COMPUTED RADIOGRAPHY SCANNING SYSTEM AND METHOD

(75) Inventor: Nelson Raymond Corby, Jr., Scotia, NY (US)

(73) Assignee: General Electric Company, Niskayuna, NY (US)

( * ) Notice: Subject to any disclaimer, the term of this patent is extended or adjusted under 35 U.S.C. 154(b) by 201 days.

(21) Appl. No.: 11/246,840

(22) Filed: Oct. 7, 2005

(65) Prior Publication Data

US 2007/0080294 A1   Apr. 12, 2007

(51) Int. Cl.
*G01T 1/161* (2006.01)
*H05B 33/00* (2006.01)

(52) U.S. Cl. ................. 250/363.02; 250/484.4
(58) Field of Classification Search ........... 250/353.02, 250/363.02, 482.1, 484.4
See application file for complete search history.

(56) References Cited

U.S. PATENT DOCUMENTS

| | | | | |
|---|---|---|---|---|
| 4,582,988 A | * | 4/1986 | Aagano | 250/585 |
| 4,707,081 A | * | 11/1987 | Mir | 359/254 |
| 4,864,134 A | | 9/1989 | Hosoi et al. | |
| 5,644,142 A | | 7/1997 | Namiki et al. | |
| 5,665,962 A | * | 9/1997 | Kimura | 250/226 |
| 2002/0008212 A1 | | 1/2002 | Arakawa et al. | |
| 2002/0011577 A1 | | 1/2002 | Arakawa et al. | |
| 2002/0096653 A1 | | 7/2002 | Karasawa | |
| 2005/0230621 A1 | * | 10/2005 | Edinger et al. | 250/311 |

FOREIGN PATENT DOCUMENTS

EP   0111278   6/1984
WO   9228505   2/1992

OTHER PUBLICATIONS

EP 06255123, EP Search Report, Jan. 12, 2007.

\* cited by examiner

*Primary Examiner*—David P. Porta
*Assistant Examiner*—Carolyn Igyarto
(74) *Attorney, Agent, or Firm*—Penny A. Clarke; Patrick K. Patnode (57) ABSTRACT

A system for obtaining data from an imaging plate is provided. The system includes a light source configured to generate a light beam and a controller operably connected to the light source and configured to scan the light beam across an object in a first direction. The system further includes a mask comprising a positionable aperture configured to transmit the light beam to the object. A position of the aperture is synchronized with a position of the light beam.

16 Claims, 6 Drawing Sheets

FIG. 6

COMPUTED RADIOGRAPHY SCANNING SYSTEM AND METHOD

BACKGROUND

The invention relates generally to computed radiography (CR) systems and more particularly to a system and method for improving the scan speed and image quality in computed radiography systems.

Computed radiography systems employ imaging techniques that capture X-rays as they pass through an object to be imaged using an imaging plate coated with storage phosphors. The object to be imaged is typically exposed with X-rays, and a latent X-ray image is formed on the imaging plate. The storage phosphors on the imaging plate when stimulated with a low energy laser beam release visible light at locations where X-rays are absorbed. The light is then captured and converted into an electrical signal, which is subsequently converted to data that can be transmitted to remote systems or locations and displayed on laser-printed films or softcopy workstations and stored digitally.

Traditionally, computed radiography scanning techniques employ a continuously scanning laser beam that repeatedly scans the imaging plate in a horizontal direction while the imaging plate is slowly moved in an orthogonal direction thus scanning the entire plate surface. Ideally, the stimulated light from a given area of the phosphor would decay to zero immediately after the stimulating laser beam moves to the next pixel position. However, in practice, the decay time is small but finite. As the laser beam continuously scans the imaging plate, it sequentially exposes all pixels on the imaging plate. The light emitted by the entire plate is then typically collected by a global collection system that collects light emitted anywhere on the plate surface and then routes the light to a light detector. Thus, the detected signal is a combination of the desired pixel intensity and the decaying signal from the previously scanned pixels on a given row. Depending on the application, the contaminating old light may extend over 6-12 previously scanned pixels. This leads to a reduction in image quality and measurement accuracy.

An alternate scanning technique currently employed in computed radiography systems comprises stepping the scanning laser beam from left to right in discrete steps across the imaging plate. The scanning laser beam progresses to the next pixel in the imaging plate only when the light from the past pixel has decayed to a near zero value, thereby restricting the scanning velocity of the laser beam.

It would therefore be desirable to develop a scanning technique and improved computed radiography system that increase the scanning velocity and improve the image quality. In addition, it would be desirable to develop a technique and system that enable the measurement of a particular section of the imaging plate to be performed independently of the rate of decay of the previously exposed sections of the imaging plate.

BRIEF DESCRIPTION

Embodiments of the present invention address this and other needs. Briefly, in accordance with one embodiment of the present invention, a system is provided. The system includes a light source configured to generate a light beam and a controller operably connected to the light source and configured to scan the light beam across an object in a first direction. The system further includes a mask comprising a positionable aperture configured to transmit the light beam to the object. A position of the aperture is synchronized with a position of the light beam.

In a second embodiment, a method for obtaining a corrected active emission signal from an imaging plate is provided. The method includes generating a light beam for scanning across the imaging plate in a first direction to stimulate the emission of photons from the imaging plate. The method further includes transmitting the light beam to the imaging plate at a beam position x0 using a mask comprising an array of cells that extends along the first direction. Further each of the cells is configured to be opened and closed. The method further includes performing a first measurement comprising opening the cell at the beam position x0, closing a set of cells at preceding beam positions x1-xN, and collecting the photons to generate an uncorrected photon count signal measurement. Then, the method includes performing at least N-1 corrective measurements to generate a respective N-1 corrective photon count signal measurements. Each of the corrective measurements comprises opening at least one member of the set of cells at preceding beam positions x1-xN, and collecting the photons to generate the respective corrective photon count signal measurement. The method further comprises generating a corrected active emission signal using the corrective photon count signal measurement.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
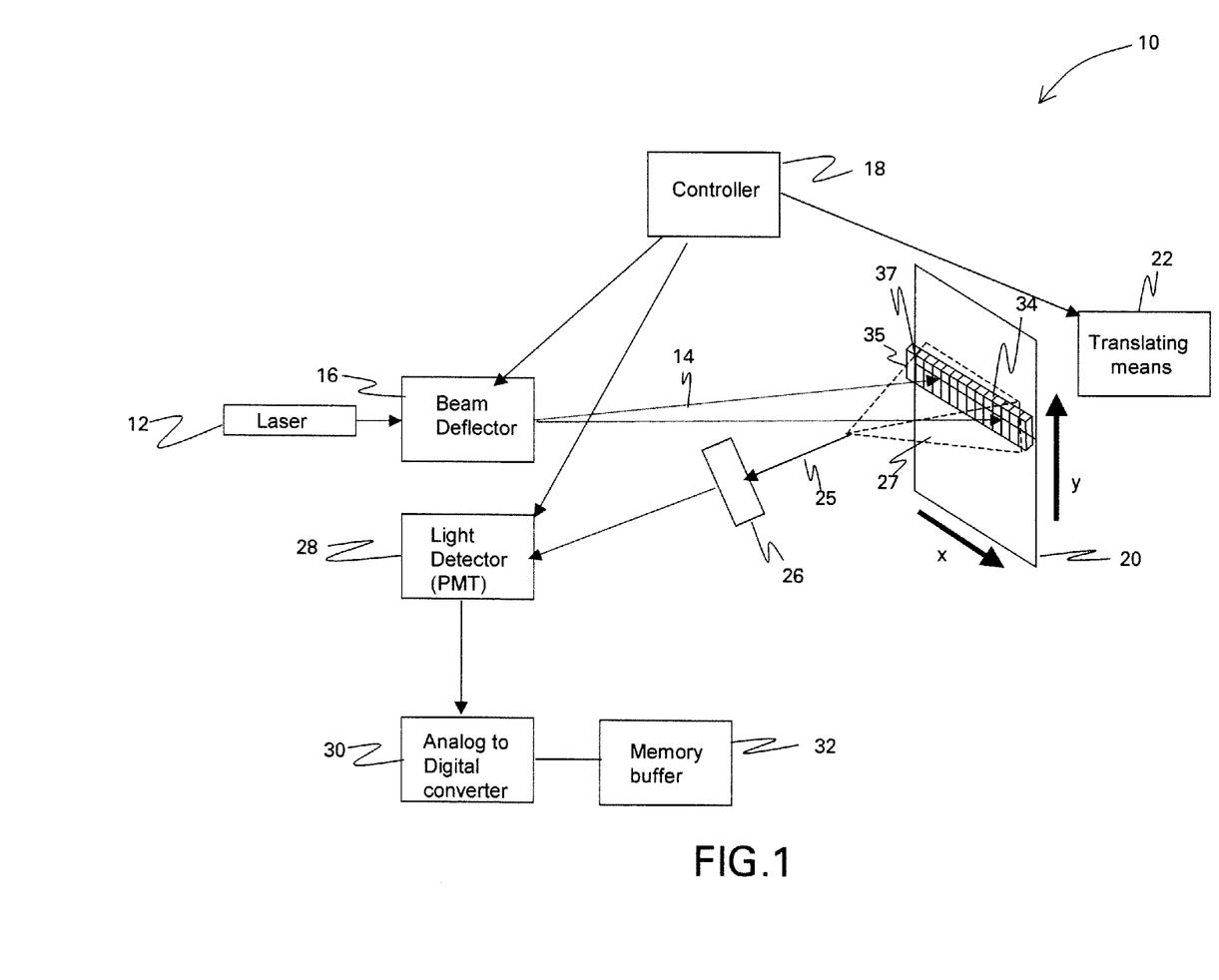
FIG. 1 is an illustration of a computed radiography (CR) scanning system with a mask comprising a movable transparent aperture whose position is synchronized with the position of the scanning laser beam, in accordance with embodiments of the present invention.

FIG. 1 is an illustration of a computed radiography (CR) scanning system with a mask comprising a movable aperture whose position is synchronized with the position of the scanning laser beam. Referring to FIG. 1, the system 10 includes a light source that generates a light beam. In one embodiment, the light source is a laser 12 that generates a light beam 14. A controller 18 coupled to a beam deflector 16 defects the light beam and controls the angular direction of the light beam 14 in a first direction x and scans the light beam repeatedly across an imaging plate 20. A translating means 22 coupled to the controller 18 enables the movement of the imaging plate 20 across a moving stage (not shown in FIG. 1) in a second direction y.

Operationally, and in accordance with the present embodiment, as the light beam 14 (typically red) scans the imaging plate in the first direction x, it stimulates the emission of photons 25 corresponding to trapped X-ray energy in the imaging plate 20. The photons 25 correspond to an earlier X-ray intensity at the site of stimulation. When the photons corresponding to trapped X-ray energy are released, a narrow spectrum of violet-blue light is emitted from the imaging plate and collected by collecting means 27. In one non-limiting example, the collecting means 27 includes an optical device, such as a fiber optic bundle (light guide), that "sees" all of the imaging plate surface and sits above it. For many implementations, the input end of the light guide is rectangular, and the output end is circular and goes to the input face of a light detector 28. The excess (residual) stimulating light 14 not required for creating the violet-blue light is scattered in and on the plate 20 and is also collected by collecting means 27. The collected photons 25 from the plate 20 pass through a blue pass-red reject optical filter 26, placed in front of a light detector (photo multiplier tube (PMT)) 28 to reject any contaminating red laser light from the light beam 14. In other words, the optical filter 26 filters the residual stimulating light from the collected photons 25 and allows the passage of only desirable stimulated light from the imaging plate 20. The emitted light travels through the optical filter 26 to the detector 28, where the light is converted to an electronic signal. The electronic signal is subsequently digitized using an analog to digital converter 30 and stored in a memory buffer 32. A recording apparatus may then sequentially read out the image data stored in the memory buffer 32. In accordance with a particular embodiment, the analog to digital converter 30 and the memory buffer 32 are also controlled by controller 18. The image formed on the recording apparatus by the computed radiography (CR) system can be subsequently used for diagnosis of the examined object.

In accordance with a further aspect of the present invention, the CR system 10 includes a mask 35 comprising a positionable aperture 34 whose position is synchronized to the readout position of the laser beam 14. According to a particular embodiment, the mask 35 is placed in close proximity to the imaging plate 20. In a particular embodiment, the aperture 34 is programmably positionable. For example, movement of aperture 34 may be controlled by controller 18. The aperture 34 allows stimulating red light 14 to pass so as to strike and stimulate the imaging plate 20 and also allows stimulated violet-blue light from the plate 20 corresponding to the spatial position of the aperture 34 to pass back towards the light collection means 27 to be collected. The aperture 34 further prevents violet-blue light from any other portion of the plate 20 to contribute to the collected photons 25. In accordance with one embodiment, the mask 35 is implemented as a one-dimensional array of cells 35 that extends along the first direction x, such that the laser beam 14 scans across the one-dimensional array of cells. In accordance with another embodiment, the mask 35 may also be implemented as a two dimensional array of cells working with a two dimensionally positionable beam 14 and therefore not requiring translating means 22. Further, and as will be described in greater detail below, each of the cells 34 and 37 is configured to be opaque in a first state and transparent in a second state. A transition between the first and the second states may be achieved by application of an electric field, a magnetic field, an optical energy flux or combinations thereof.

Figure 5:
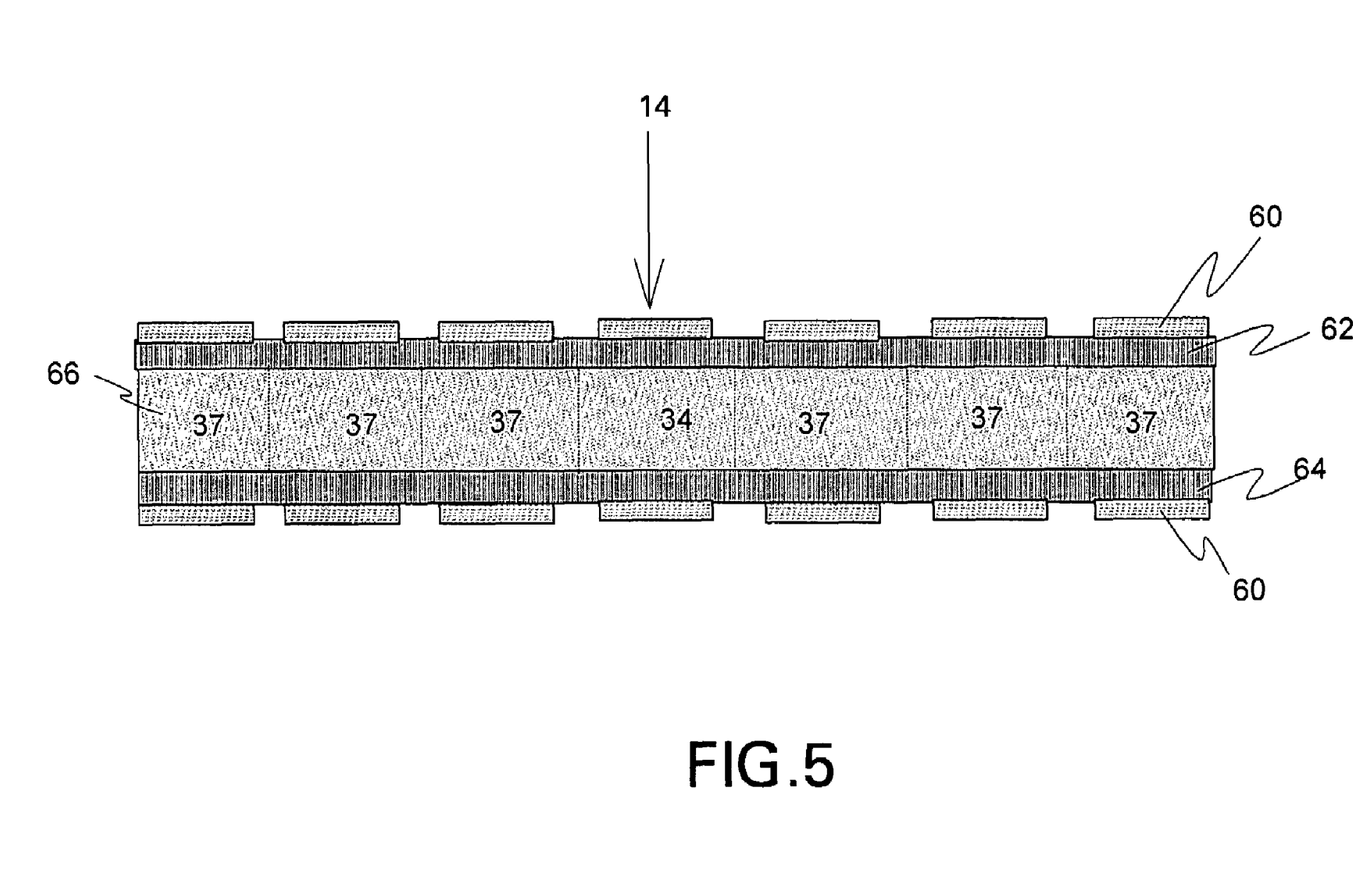
FIG. 5 illustrates an exemplary aperture configuration.

The exemplary embodiment of the mask 35 depicted in FIG. 5, shows a side view of a one-dimensional collection of light modulating cells 37 and the stimulating light beam 14 striking the array face. The mask 35 (shown in side view) comprises an array of cells 37 each of which has controllable optical transmission states. Each cell 37 is selectively addressed by respective electrodes 60. In this example, activation of an electrode pair 60 causes the optical transmission of the corresponding cell 37 to switch from one transmission value to the other of its two states. To form a scanning transparent aperture 34, all cells 37 (except 34) are driven so as to place the given cell 37 in an optically opaque state. The location at which transmission is desired (active cell 34) is driven by electrodes 60 so as to achieve an optically transparent state. The electrode system 60 is shown to indicate functional control at a particular cell 37 and will be of a physical type (not necessarily electrical) suitable to conduct the required energy type to the cell 37. In particular embodiments, control on electrodes 60 will be binary in nature to cause opacity or translucency of cell 37 during the application of the control signal. More particularly, transparency of cell 37 will be determined by the continuous presence of the applied control signal on electrode system 60, but it is understood that the control signal on electrode system 60 may be of a type whose momentary presence causes cell 37 to optically 'toggle" between the two desired states of transparency. Further, the transmission state of aperture 34 may be determined by electro-optical, magneto-optic or by an optical means. For the exemplary embodiment shown in FIG. 5, the mask 35 with the positionable aperture 34 includes an upper substrate 62, a lower substrate 64 and a material 66 disposed between the upper substrate 62 and the lower substrate 64. In a particular embodiment, the material 66 used is a liquid crystal or a polarizable material. According to a more particular embodiment, the material 66 used is a nematic liquid crystal.

Figure 6:
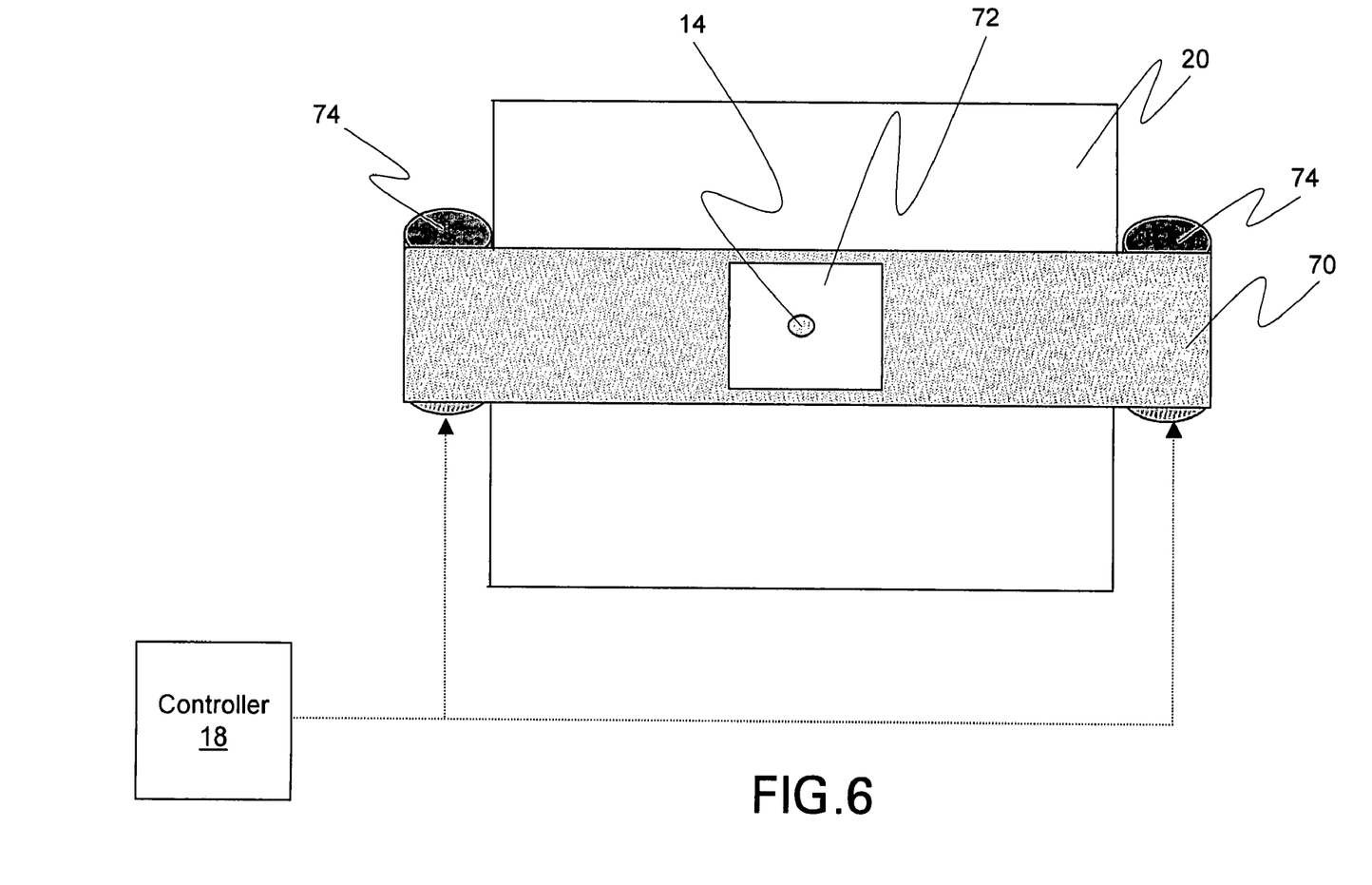
FIG. 6 illustrates another exemplary aperture configuration.

In another embodiment, a one-dimensional scanning aperture may also be implemented as a moving band of opaque material 70 with a transparent window 72, as shown for example in FIG. 6. In one embodiment, the moving band 70 is a taut strip of material held by two scanning means 74. In accordance with the exemplary embodiment shown in FIG. 6, the CR system 10 includes a scanning means 74 for moving the transparent window 72 across the imaging plate 20 in the direction x, synchronously with the light beam 14. Motion of the aperture 72 is accomplished by coordinated movements of the scanning means 74. The opaque material may include, for example, metal or plastic chosen for optical opacity and low mass. The scanning means 74 is further controlled by the controller 18 to move the transparent window synchronously with the light beam 14.

Figure 2:
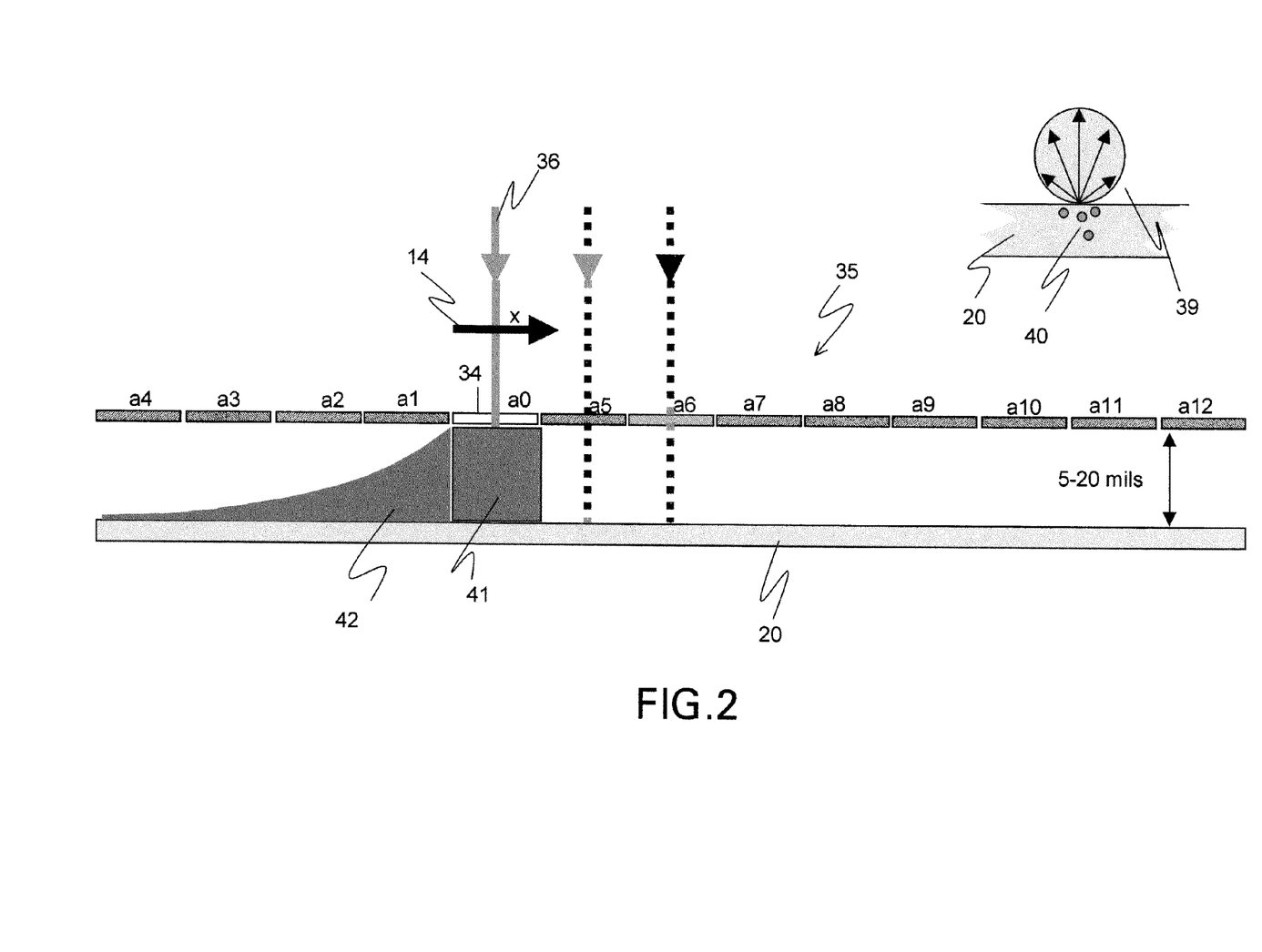
FIG. 2 is an illustration of an aperture based beam readout technique in accordance with embodiments of the present invention.

FIG. 2 is an illustration of an aperture based beam readout technique in accordance with embodiments of the present invention. As shown in FIG. 2, the positionable aperture 34 of the mask 35 is a moving aperture synchronized to the readout position of the laser beam 14. In accordance with one embodiment, the mask 35 is implemented as a one-dimensional array of cells (a0-a12) that extends along the scan direction of the laser beam x and placed in close proximity to the imaging plate being scanned. As will be appreciated by those skilled in the art, the cells (a0-a12) depicted in FIG. 2 is for illustrative purposes only, and is not meant to limit the number of cells that can be present in the mask 35. In a further aspect of the present embodiment, each of the cells (a0-a12) is configured to be opaque in a first state and transparent in a second state. According to a particular embodiment, a transition between the first and second states is achieved by variation of at least one of an applied electric field, a magnetic field, or an optical energy flux. Scanning of the transparent aperture in space is effected by sequentially changing the array address of the transparent cell in time, while maintaining all other cells in an opaque state. In an exemplary implementation, and as shown in FIG. 2, the aperture 34 is designed to be transmissive at cell position a0 and is synchronized to the current readout position 36 of the laser beam 14. The aperture is designed to be opaque at the other cell positions a1-a12.

Operationally, in accordance with one embodiment of the invention, the laser beam 14 scans across the imaging plate 20 in the first direction x at a particular constant scanning velocity v. The imaging plate 20, at a location previous to the read-out by the CR system, has been exposed to an X-ray beam passing through an object of interest. The read-out laser beam 14 strikes the storage phosphor of the imaging plate 20 after passing through the aperture formed by transparent cell 34 and stimulates the emission of previously trapped energy 39 from one or more trap centers 40 located in a volume of the imaging plate 20 located directly below the point at which the stimulating beam 14 strikes the imaging plate 20. The light emitted by plate 20 due to the stimulating beam 14 passes through the still transparent aperture 34 and is collected. Further, the scanning velocity v may be derived based on mechanical constraints as well as optical noise considerations of the CR system and is adjusted based on the desired pixel dwell time. In one example, the pixel dwell time is adjusted to one micro second.

Referring to FIG. 2 again, the bar, 41 represents the instantaneous intensity of emitted violet-blue light released from the imaging plate 20 at the current readout position 36 of the laser beam 14 assuming that aperture 34 is transmissive. As may be observed from FIG. 2, the emitted light 41 from the imaging plate 20 appears nearly instantaneously (typically on the order of nano seconds) after illumination by laser beam 14. After the laser beam 14 ceases to strike plate 20, the area stimulated by laser beam 14 continues to emit violet-blue light for a time with exponentially decreasing intensity over time. For example, as shown in FIG. 2, the X-ray exposure is initially uniform across the plate 20. The intensity of decaying light at four sequential sites previously illuminated by the laser beam 14 when the beam is at position 36 is represented by an exponentially decaying signal 42.

As may be observed from FIG. 2, the aperture based readout technique disclosed in accordance with embodiments of the present invention, increases the possible scan speed and improves the image quality for a continuously scanned CR system since only the stimulated emission of the current pixel position 36 is measured and the stimulated light is not contaminated by exponentially decaying light emitted from past pixel locations currently not being stimulated. As will be appreciated by those skilled in the art, existing CR systems typically scan slowly so that the light from all previously stimulated pixels has decayed sufficiently so as to not corrupt the current measurement at beam position 36.

Figure 3:
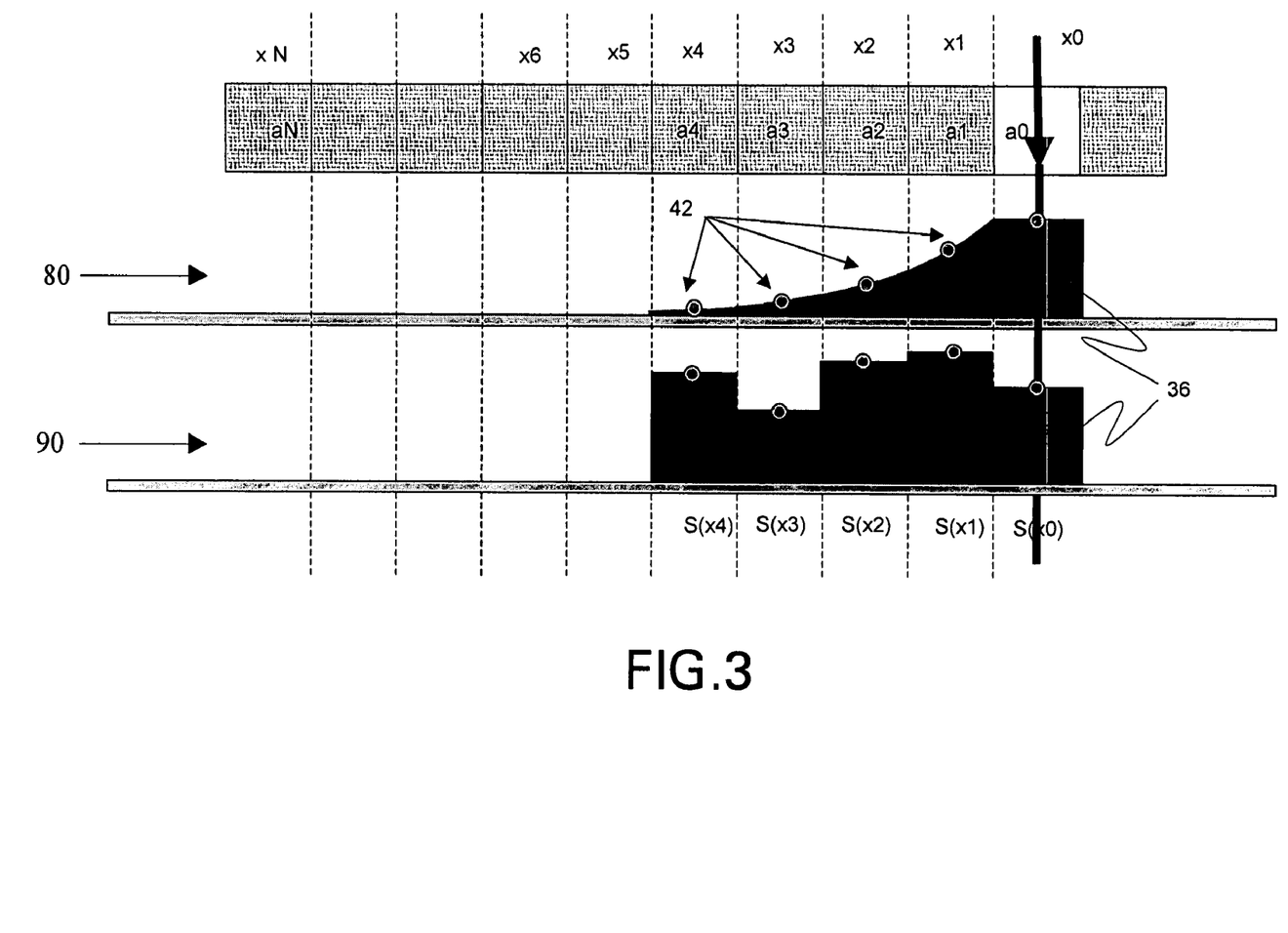
FIG. 3 is an illustration of the technique for estimating an active emission signal at a current beam readout position in accordance with one embodiment of the present invention.

FIG. 3 is an illustration of a technique for estimating an active emission signal at a current beam readout position in accordance with one embodiment of the present invention. Reference numeral 80 indicates an illustrative example for a plate originally exposed with a constant x-ray value everywhere, and reference numeral 90 indicates an illustrative example for a plate exposed with a spatially varying x-ray exposure. In accordance with an exemplary implementation, the mask 35 comprising the moving aperture 34 is designed to be transmissive at cell position a0 and is synchronized to the current readout position x0 of the laser beam. Further, in accordance with the present embodiment, each of the cells (a0-aN) are configured to be opaque in a first state and transparent in a second state. An open cell has a first transmission coefficient, and a closed cell has a second transmission coefficient. As will be appreciated by those skilled in the art, an ideal transmission coefficient for an open cell of 1.0 and a closed cell of 0.0 may not be achievable in practice. In one example, the high transmission value is 0.98, and the low transmission value is 0.01. The transmission values tend to be stable and repeatable, i.e. each time the cell is driven to either of its two states, the same transmission value results. Therefore, in accordance with embodiments of the present invention, a number of corrective measurements are performed to estimate the true active emission signal for beam position x0 and remove the influence of the imperfect apertures that block their decaying light, in a manner as will be described in greater detail below.

In accordance with one embodiment, the technique for estimating the active emission signal at a given location x0 (when possibly contaminated by decaying light from previously scanned pixels at a1, a2, a3 and a4) comprises opening the aperture at cell a0 while the beam is positioned at position x0, making a measurement (to be subsequently corrected), and then closing the cell a0 rapidly, making a succession of measurements designed to measure the decaying light intensity at all the positions of interest that were previously visited. In one embodiment, the rapid closing of the cell a0 is performed within a time frame of 10 nanoseconds. For the illustrated case in which knowledge of the decayed light intensity at the previous 4 cells is sufficient to correct the signal at a0, each of the subsequent cells (a1, a2, a3 and a4) open and close in similarly small times (on the order of 10 nanoseconds for either transition) and remain open for 100 nanoseconds while the correction signal is acquired. Thus, a total of 600 nanoseconds (120×5 nanoseconds) would be required to determine data sufficient to yield a corrected value at a0. If a number other than 4 was deemed sufficient, the overall time per point would grow or shrink in proportion. The goal is to make all the correction measurements as rapidly as possible so that the nature of the decaying light levels would not change significantly. If, however, the transmissivity of the apertures can be made sufficiently close to 0.0 and 1.0, it is anticipated that only measurement at a0 will be required with no additional correction measurements. This would result in the highest possible scanning speed gain.

It may be noted that in the discussion that follows, the residual red stimulating light is not considered due the blocking action of filter 26. After measurement with a0 open and all other apertures closed, a number of corrective photon count signal measurements are then generated by rapidly opening one other member of the set of cells a1-aN at the preceding beam positions x1-xN (while aperture a0 is kept closed), and measuring the light intensity. The aperture is then closed, another cell is opened and a measurement is made. This is repeated for all remaining cells in rapid succession. In one embodiment, an exemplary order of opening the apertures is a1, a2, a3, a4. However, it is to be appreciated that other exemplary orders of opening the cells may also be implemented. The uncorrected photon count signal measurement at x0 is then corrected using the corrective photon count signal measurements to generate a corrected active emission signal. For this example, the corrected active emission signal corresponds to a stimulated, uncontaminated photon count signal measurement.

In accordance with a further aspect of the present invention, a set of N emission intensities $S(x1)$-$S(xN)$ are related to N corrective photon count signal measurements to generate a number of equations (as shown below). The relation comprises weighting each of the N emission intensities, $S(x1)$-$S(xN)$ with a respective cell transmission coefficient $a(1)$-$a(N)$ to determine the respective cell emission contribution $a(1)*S(x1) \ldots a(N)*S(xN)$. As mentioned above, an open cell has a first transmission coefficient, and a closed cell has a second transmission coefficient (determined by prior measurement).

Referring to equations (1)-(5) below, $S(x0)$ is the desired, unknown value of uncontaminated emission at position x0 and similarly, $S(x1)$, $S(x2)$, $S(x3)$ and $S(x4)$ are the unknown uncontaminated values of decaying light at positions x1, x2, x3 and x4. The variables PMT(0), PMT(1), PMT(2), PMT(3) and PMT(4) are the measurements made when the respective aperture is open (with all others closed). After the N measurements have been made, the set of equations are solved for S(x0) the estimate of the uncorrupted emission from position x0. Then, the light beam 14 is advanced to a new beam position, the N readings taken and the correction steps are performed to generate the corrected active emission signal for the new beam position. This cycle is repeated for all desired locations on the plate 20. It will be appreciated by those skilled in the art that it is possible to use additional measurements (for example with more than one aperture open at a time) to determine M equations in N unknowns (M>N). Techniques exist to solve such over-determined sets of equations that will give increasingly better estimates of the desired parameters. This would, of course, increase the time spent at each point x0 and thus decrease the overall scan speed.

In particular, equation (1) represents an open aperture a0 with all other apertures (a1)-(a4) closed when the stimulating beam 14 strikes the imaging plate 20 at position x0. Equations (2)-(5) represent the condition when aperture a0 is closed. In particular, equation (2) represents the condition when aperture a1 is open and all other apertures are closed. Similarly, equation (3) represents the condition when aperture a2 is open and all the other apertures are closed. Equations (4) and (5) follow this similar pattern. It is to be appreciated that the number of equations to be solved depends on the decay characteristics of the particular storage phosphor being used, which can be experimentally determined. In general, for computed radiography phosphors, sufficient correction results by considering 3 to 5 previous apertures. However, slower phosphor decay rates require the solving of a larger number of equations. Equations (1)-(5) are depicted below.

$$PMT(0)=a0*S(x0)+a1*S(x1)+a2*S(x2)+a3*S(x3)+a4*S(x4) \quad (1)$$

$$PMT(1)=a0*S(x0)+a1*S(x1)+a2*S(x2)+a3*S(x3)+a4*S(x4) \quad (2)$$

$$PMT(2)=a0*S(x0)+a1*S(x1)+a2*S(x2)+a3*S(x3)+a4*S(x4) \quad (3)$$

$$PMT(3)=a0*S(x0)+a1*S(x1)+a2*S(x2)+a3*S(x3)+a4*S(x4) \quad (4)$$

$$PMT(4)=a0*S(x0)+a1*S(x1)+a2*S(x2)+a3*S(x3)+a4*S(x4) \quad (5)$$

Referring again to equations (1)-(5) above, the values of a0 a1, a2, a3 and a4 are one of two experimentally determined a priori aperture transmission values. As mentioned above, in one example, the high transmission value is 0.98, and the low transmission value is 0.01. A cell with these transmission coefficients would probably not require correction. However, values nearer 0.10 and 0.90 would make use of the described correction procedure. In accordance with one embodiment, the active emission signal for the beam position x0 corresponds to S(x0), which represents a stimulated uncontaminated photon count signal measurement at beam position x0, when the apertures are less than ideal. It will be appreciated by those skilled in the art, that the sequential PMT values (with their required aperture states) must be determined rapidly with respect to the decay rate of the storage phosphor. In one embodiment, rapidly is defined to represent a determination of five PMT values within 20% of a decay time constant.

Figure 4:
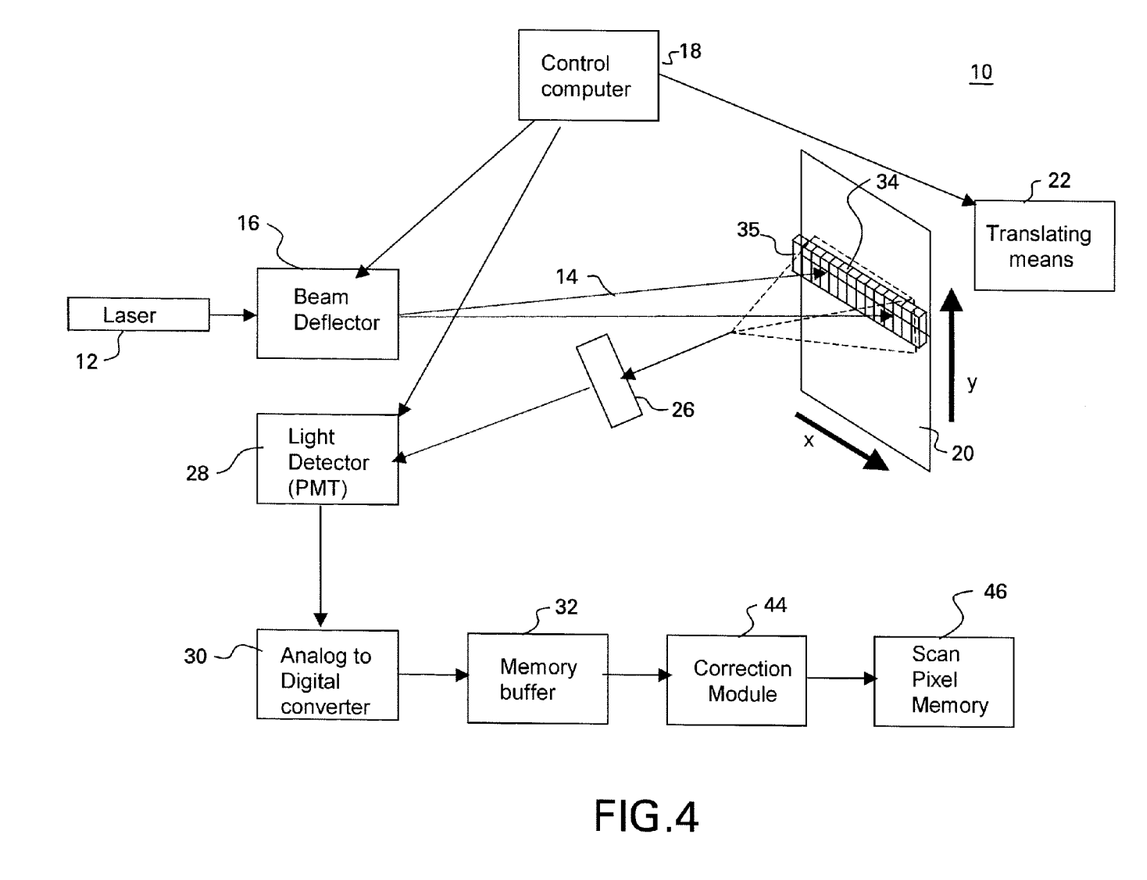
FIG. 4 is an illustration of a CR scanning system with a correction module configured to estimate an active emission signal in accordance with the technique described in FIG. 3.

FIG. 4 is an illustration of a CR scanning system with a correction module configured to estimate an active emission signal in accordance with the technique described in FIG. 3. The correction module 44 is configured to perform a series of measurements. The first measurement comprises opening a cell at a particular beam position x0 and closing a set of cells at other beam positions, x1-xN. The detector 28 collects the photons to generate an uncorrected photon count signal measurement. The correction module is further configured to perform at least N-1 additional measurements to generate a number of N-1 corrective photon count signal measurements. Each of the corrective measurements comprises opening at least one member of the set of cells at the other beam positions x1-xN and collecting the photons using the detector 28 to generate the respective corrective photon count signal measurement. Then, the correction module 44 is configured to generate a corrective active emission signal using the corrective photon count signal measurement.

In a particular embodiment, the correction module 44 is further configured to relate a number of N emission intensities, S(x1)-S(xN) to N corrective photon count signal measurements to generate a number of equations. The relation comprises weighting each of the N emission intensities S(x1)-S(xN) with a respective transmission coefficient a(1)-a(N) to determine the respective emission contribution a(1)* S(x1)-a(N)*S(xN). As mentioned above, an open aperture has a first transmission coefficient, and a closed aperture has a second transmission coefficient. As mentioned above, the solution of the resulting N equations in N unknowns results in the estimated value S(x0) for the position in question. The N measured PMT values [PMT(0), PMT(1), . . . PMT(N-1)] one for each combination of open and closed shutters and the N known aperture transmissions values [a(0), a(1) . . . a(N-1)] enable the creation of the set of equations with [S(x0), S(x1) . . . S(xN-1)] being the unknown actual values of stimulated emission and decaying un-stimulated emissions. The desired variable is, S(x0), which is the estimate of the emitted intensity at position x0 with no contribution from the decaying emissions. The pixel scan memory 46 stores the estimated active emission signal, and the above technique is repeated for the next pixel located in sequence on the imaging plate. In general, a typical progression traverses the entire width of the plate 20 in a left to right scan. The correction module 44 and the scan Pixel Memory 46 are controlled by control computer 18. As will be appreciated by those skilled in the art, if the transmission coefficients are sufficiently close to 1 and 0, only one measurement per x0 will be required, greatly speeding up the beam scan rate.

The aperture based readout technique disclosed in accordance with embodiments of the present invention offers several advantages including high scanning speeds and improved image quality. The aperture based readout technique defines actual pixel locations on the plate surface rather than inferring the locations from sampling light output at a constant rate thereby reducing the image noise and improving the image quality. Also, as mentioned above, the aperture readout technique improves the image quality for a continuously scanned system since only the emission of the current pixel position is measured and not the sum of the light from the current pixel along with the light from all past (exponentially decaying) exposed pixels.

Although only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system comprising:
   a light source configured to generate a light beam;
   a controller operably connected to the light source and configured to scan the light beam across a computed radiography imaging plate in at least a first direction (x) to stimulate emission of a plurality of photons from the computed radiography imaging plate;

a mask comprising a positionable aperture configured to transmit the light beam to the computed radiography imaging plate at a beam position x0, wherein a position of the aperture is synchronized with a position of the light beam, wherein the mask comprises a one dimensional array of cells that extends along the first direction (x) such that the light beam scans across the one dimensional array of cells, and wherein each of the cells is selectively addressable and configured to be opened and closed, wherein the controller is further configured to control the mask;

a collecting means configured to collect the photons emitted from the computed radiography imaging plate;

an optical filter configured to filter residual stimulating light from the collected photons;

a detector for collecting the photons from the optical filter; and a correction module configured to:

perform a first measurement comprising: opening a cell at the beam position x0 and closing a set of cells at preceding beam positions x1-xN, wherein the detector collects the photons to generate an uncorrected photon count signal measurement;

perform at least N−1 additional measurements to generate a respective plurality of N−1 corrective photon count signal measurements, each of the corrective measurements comprising: opening at least one member of the set of cells at preceding beam positions x1-xN, and collecting the photons using the detector to generate the respective corrective photon count signal measurement; and generate a corrected active emission signal using the corrective photon count signal measurements.

2. The system of claim 1, wherein the light source comprises a laser, wherein the light beam comprises a positionable laser beam that stimulates emission of the photons from the imaging plate, the system further comprising:

a beam deflector;

a translating means configured to move the imaging plate in a second direction (y); and a collecting means configured to collect the photons emitted from the imaging plate wherein the controller is further configured to control the beam deflector, translating means and the aperture.

3. The system of claim 2, wherein each of the cells is configured to be closed in a first state and to be open in a second state, and wherein a transition between the first and second states is achieved by application of at least one of an electric field, a magnetic field, and an optical energy flux.

4. The system of claim 3, wherein the positionable aperture comprises an electro-optic aperture.

5. The system of claim 3, wherein the positionable aperture comprises a magneto-optic aperture.

6. The system of claim 3, wherein the positionable aperture comprises an optically switchable aperture.

7. The system of claim 3, wherein the positionable aperture comprises a material comprising one of a liquid crystal and a polarizable material.

8. The system of claim 7, wherein the positionable aperture comprises a nematic liquid crystal.

9. The system of claim 7, wherein the positionable aperture further comprises:

an upper substrate;

a lower substrate, wherein the material is disposed between the upper and lower substrates; and a plurality of electrodes configured to selectively address the cells by applying at least one of an electric field, a magnetic field or an optical energy flux or a combination thereof to the selected cells to cause a desired optical transparency.

10. A system comprising:

a light source configured to generate a light beam;

a controller operably connected to the light source and configured to scan the light beam across an object comprising a computed radiography imaging plate in at least a first direction (x);

a mask comprising a positionable aperture configured to transmit the light beam to the object at a beam position x0, wherein a position of the aperture is synchronized with a position of the light beam, wherein the mask comprises a two dimensional array of cells wherein each of the cells is selectively addressable to assume at least a first and a second state of transmission, and wherein a transition between the first and second states is achieved by application of at least one of an electric field, a magnetic field, and an optical energy source, wherein the controller is further configured to control the mask;

a collecting means configured to collect the photons emitted from the computed radiography imaging plate;

an optical filter configured to filter residual stimulating light from the collected photons;

a detector for collecting the photons from the optical filter; and a correction module configured to:

perform a first measurement comprising: opening a cell at the beam position x0 and closing a set of cells at preceding beam positions x1-xN, wherein the detector collects the photons to generate an uncorrected photon count signal measurement;

perform at least N−1 additional measurements to generate a respective plurality of N−1 corrective photon count signal measurements, each of the corrective measurements comprising: opening at least one member of the set of cells at preceding beam positions x1-xN, and collecting the photons using the detector to generate the respective corrective photon count signal measurement; and generate a corrected active emission signal using the corrective photon count signal measurements.

11. The system of claim 3, wherein the mask is further configured to transmit the light beam to the imaging plate at a beam position x0, wherein each of the cells in the one-dimensional array of cells of the mask is configured to be opened and closed.

12. The system of claim 1, wherein the correction module is further configured to:

relate a plurality of N emission intensities S(x1)-S(xN) to N corrective photon count signal measurements to generate a plurality of equations, wherein the relation comprises weighting each of the N emission intensities S(x1)-S(xN) with a respective transmission coefficient a(1)-a(N) to determine the respective emission contribution a(1)*S(x1)-a(N)*S(xN), wherein an open cell has a first transmission coefficient and a closed cell has a second transmission coefficient; and solve the equations to generate the corrected active emission signal for the beam position x0.

13. A method for obtaining a corrected active emission signal from an imaging plate, the method comprising:

generating a light beam for scanning across the imaging plate in at least a first direction (x) to stimulate emission of a plurality of photons from the imaging plate;

transmitting the light beam to the imaging plate at a beam position x0 using a mask comprising an array of cells that extends along the first direction (x), wherein each of the cells is configured to be opened and closed;

performing a first measurement comprising: opening the cell at the beam position x0, closing a set of cells at preceding beam positions x1-xN, and collecting the photons to generate an uncorrected photon count signal measurement;

performing at least N−1 corrective measurements to generate a respective plurality of N−1 corrective photon count signal measurements, each of the corrective measurements comprising: opening at least one member of the set of cells at preceding beam positions x1-xN, and collecting the photons to generate the respective corrective photon count signal measurement; and generating a corrected active emission signal using the corrective photon count signal measurements.

14. The method of claim 13, wherein the step of generating the corrected active emission signal comprises:

relating a plurality of N emission intensities S(x1) S(xN) to N corrective photon count signal measurements to generate a plurality of equations, wherein the relation comprises weighting each of the N emission intensities S(x1)-S(xN) with a respective transmission coefficient a(1)-a(N) to determine the respective emission contribution a(1)*S(x1)-a(N)*S(xN), wherein an open cell has a first transmission coefficient and a closed cell has a second transmission coefficient; and solving the equations to generate the corrected active emission signal for the beam position x0.

15. The method of claim 14, further comprising advancing the light beam to a new beam position and repeating the performing and correcting steps to generate the corrected active emission signal for the new beam position.

16. The system of claim 10, wherein the light source comprises a laser, wherein the light beam comprises a positionable laser beam that stimulates emission of the photons from the imaging plate, the system further comprising:

a beam deflector; and a translating means configured to move the imaging plate in a second direction (y), wherein the controller is further configured to control the beam deflector, translating means and the aperture.

* * * * *

UNITED STATES PATENT AND TRADEMARK OFFICE
CERTIFICATE OF CORRECTION

PATENT NO. : 7,402,806 B2 Page 1 of 2
APPLICATION NO. : 11/246840
DATED : July 22, 2008
INVENTOR(S) : Nelson Raymond Corby, Jr.

It is certified that error appears in the above-identified patent and that said Letters Patent is hereby corrected as shown below:

On the Title Page, in Field (56), under "FOREIGN PATENT DOCUMENTS", in Column 2, Line 2, delete "9228505" and insert -- 9202850 --, therefor.

In the drawings
Delete drawing sheet 5 of 6, and substitute the attached sheet consisting of figure 5, therefor.

In Column 11, Line 21, in Claim 14, delete "S(x1) S(xN)" and insert -- S(x1)-S(xN) --, therefor.

Signed and Sealed this

Twenty-sixth Day of May, 2009

JOHN DOLL
*Acting Director of the United States Patent and Trademark Office*

FIG. 5